(12) United States Patent
Bombet et al.

(10) Patent No.: US 7,599,139 B1
(45) Date of Patent: Oct. 6, 2009

(54) DISK DRIVE HAVING A HIGH PERFORMANCE ACCESS MODE AND A LOWER PERFORMANCE ARCHIVE MODE

(75) Inventors: Marc A. Bombet, Trabuco Canyon, CA (US); William B. Boyle, Lake Forest, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/767,315

(22) Filed: Jun. 22, 2007

(51) Int. Cl.
*G11B 27/36* (2006.01)
(52) U.S. Cl. .............................. 360/31; 360/48; 360/75
(58) Field of Classification Search ........................ None
See application file for complete search history.

(56) References Cited

U.S. PATENT DOCUMENTS

| | | | |
|---|---|---|---|
| 4,642,715 A | 2/1987 | Ende | |
| 4,949,036 A | 8/1990 | Bezinque et al. | |
| 5,487,077 A | 1/1996 | Hassner et al. | |
| 5,600,500 A | 2/1997 | Madsen et al. | |
| 5,682,273 A * | 10/1997 | Hetzler | 360/75 |
| 5,872,800 A | 2/1999 | Glover et al. | |
| 5,909,334 A | 6/1999 | Barr et al. | |
| 5,923,485 A | 7/1999 | Ito | |
| 5,930,358 A | 7/1999 | Rao | |
| 5,941,998 A | 8/1999 | Tillson | |
| 6,052,804 A | 4/2000 | Thowe et al. | |
| 6,181,500 B1 | 1/2001 | Serrano et al. | |
| 6,266,199 B1 | 7/2001 | Gillis et al. | |
| 6,289,484 B1 | 9/2001 | Rothberg et al. | |
| 6,317,850 B1 | 11/2001 | Rothberg | |
| 6,327,106 B1 | 12/2001 | Rothberg | |
| 6,359,744 B1 | 3/2002 | Mallary | |
| 6,384,999 B1 | 5/2002 | Schibilla | |
| 6,393,511 B1 | 5/2002 | Albrecht et al. | |
| 6,429,984 B1 | 8/2002 | Alex | |
| 6,490,111 B1 | 12/2002 | Sacks | |
| 6,603,617 B1 | 8/2003 | Cross | |
| 6,606,211 B1 | 8/2003 | Lim et al. | |
| 6,628,466 B2 | 9/2003 | Alex | |
| 6,650,492 B2 | 11/2003 | Lenny et al. | |
| 6,661,597 B1 * | 12/2003 | Codilian et al. | 360/75 |
| 6,691,255 B1 | 2/2004 | Rothberg et al. | |
| 6,697,203 B1 | 2/2004 | Cheng et al. | |
| 6,714,368 B1 | 3/2004 | Himle et al. | |
| 6,747,827 B1 | 6/2004 | Bassett et al. | |
| 6,781,780 B1 | 8/2004 | Codilian | |
| 6,791,775 B2 | 9/2004 | Li et al. | |
| 6,798,591 B2 | 9/2004 | Barnett et al. | |
| 6,809,893 B2 | 10/2004 | Uzumaki et al. | |
| 6,826,007 B1 | 11/2004 | Patton, III | |

(Continued)

*Primary Examiner*—Jason C Olson
(74) *Attorney, Agent, or Firm*—Howard H. Sheerin, Esq.

(57) ABSTRACT

A disk drive is disclosed including a disk having a plurality of tracks, and a head actuated over the disk. A write frequency of write data received from a host is monitored. When the write frequency falls below a threshold, the disk drive is configured to operate in a low frequency access mode when accessing the disk, wherein a parameter of the disk drive is configured to increase the reliability of the disk drive. When the write frequency rises above a threshold, the disk drive is configured to operate in a high frequency access mode when accessing the disk, wherein the parameter of the disk drive is configured to increase the performance of the disk drive.

28 Claims, 7 Drawing Sheets

U.S. PATENT DOCUMENTS

| | | |
|---|---|---|
| 6,854,022 B1 | 2/2005 | Thelin |
| 6,854,071 B2 | 2/2005 | King et al. |
| 6,862,505 B2 | 3/2005 | Satoh et al. |
| 6,892,249 B1 | 5/2005 | Codilian et al. |
| 6,895,500 B1 | 5/2005 | Rothberg |
| 6,898,033 B2 | 5/2005 | Weinstein et al. |
| 6,947,234 B2 | 9/2005 | Lamberts et al. |
| 6,948,102 B2 | 9/2005 | Smith |
| 6,950,967 B1 | 9/2005 | Brunnett et al. |
| 6,982,842 B2 | 1/2006 | Jing et al. |
| 6,987,630 B1 | 1/2006 | Higgins et al. |
| 6,995,933 B1 | 2/2006 | Codilian et al. |
| 7,006,321 B2 | 2/2006 | Kisaka |
| 7,024,614 B1 | 4/2006 | Thelin et al. |
| 7,032,127 B1 | 4/2006 | Egan et al. |
| 7,050,252 B1 | 5/2006 | Vallis |
| 7,057,839 B2 * | 6/2006 | Shikuma et al. ............... 360/67 |
| 7,076,604 B1 | 7/2006 | Thelin |
| 7,082,494 B1 | 7/2006 | Thelin et al. |
| 7,120,737 B1 | 10/2006 | Thelin |
| 7,143,203 B1 | 11/2006 | Altmejd |
| 7,173,782 B2 | 2/2007 | Ikeda et al. |
| 7,477,465 B2 | 1/2009 | Yu |
| 2003/0007269 A1 | 1/2003 | Alex |
| 2003/0016461 A1 | 1/2003 | Seng et al. |
| 2004/0153949 A1 | 8/2004 | Ro et al. |
| 2004/0174627 A1 | 9/2004 | Kim et al. |
| 2004/0252397 A1 | 12/2004 | Hodge et al. |
| 2004/0264028 A1 | 12/2004 | Ishii et al. |
| 2004/0268033 A1 | 12/2004 | Chia et al. |
| 2005/0036437 A1 | 2/2005 | Learned et al. |
| 2005/0078393 A1 | 4/2005 | Cho |
| 2005/0146803 A1 | 7/2005 | Kim et al. |
| 2005/0188153 A1 | 8/2005 | Yun et al. |
| 2005/0207049 A1 | 9/2005 | Ikeda et al. |
| 2006/0066971 A1 | 3/2006 | Alex et al. |
| 2006/0098318 A1 | 5/2006 | Feng |
| 2006/0101197 A1 | 5/2006 | Georgis et al. |
| 2006/0132954 A1 | 6/2006 | Wada et al. |
| 2006/0198041 A1 * | 9/2006 | Kuwamura ................... 360/68 |
| 2006/0076315 A1 | 4/2007 | McMurtrey |
| 2007/0223124 A1 * | 9/2007 | Amemiya .................... 360/31 |
| 2007/0277011 A1 * | 11/2007 | Tanaka et al. ............... 711/162 |

* cited by examiner

DISK DRIVE HAVING A HIGH PERFORMANCE ACCESS MODE AND A LOWER PERFORMANCE ARCHIVE MODE

BACKGROUND

1. Field

The present invention relates to disk drives for computer systems. In particular, the present invention relates to a disk drive having a high performance access mode and a lower performance archive mode.

2. Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

During a write operation, a current is applied to a write element of the head (e.g., a write coil) to create a magnetic field which magnetizes the surface of the disk by orienting the direction of magnetic grains (e.g., horizontally in longitudinal magnetic recording, or vertically in perpendicular magnetic recording). The orientation of the grains exhibits hysteresis thereby generating their own magnetic field when the write magnetic field is removed. During a read operation, a read element of the head (e.g., a magnetoresistive element) transduces the magnetic field emanating from the disk surface into a read signal that is demodulated into an estimated data sequence.

The hysteresis of the magnetic grains is not permanent meaning that over time the grains will orientate into random directions (magnetic entropy) until the magnetic field is no longer sensed reliably (leading to data errors during reproduction). Magnetic entropy may also be precipitated by various factors, such as increasing ambient temperature. That is, at higher temperatures the uniform alignment of the grains will degrade faster. Another factor that precipitates magnetic entropy is a phenomenon referred to as adjacent track interference (ATI) wherein when writing data to a target track, the fringe field from the write element degrades the uniform alignment of the grains recorded in an adjacent track. The degrading effect of ATI on the adjacent tracks compounds over time with each write operation to the target track. Eventually, the magnetic field emanating from the disk surface will deteriorate to the point that the data is no longer recoverable.

There is, therefore, a need for an improved reliability disk drive that compensates for magnetic entropy.

SUMMARY OF THE EMBODIMENTS OF THE INVENTION

An embodiment of the present invention comprises a disk drive including a disk having a plurality of tracks, and a head actuated over the disk. A write frequency of write data received from a host is monitored. When the write frequency falls below a threshold, the disk drive is configured to operate in a low frequency access mode when accessing the disk, wherein a parameter of the disk drive is configured to increase the reliability of the disk drive. When the write frequency rises above a threshold, the disk drive is configured to operate in a high frequency access mode when accessing the disk, wherein the parameter of the disk drive is configured to increase the performance of the disk drive.

In one embodiment, a plurality of zones are defined on the disk, including a first zone and a second zone. A write frequency of write data received from the host is monitored for the first and second zones. When the write frequency for the first zone falls below a threshold, the disk drive is configured to operate in the low frequency access mode when accessing the first zone. When the write frequency for the first zone rises above a threshold, the disk drive is configured to operate in the high frequency access mode when accessing the first zone. When the write frequency for the second zone falls below a threshold, the disk drive is configured to operate in the low frequency access mode when accessing the second zone. When the write frequency for the second zone rises above a threshold, the disk drive is configured to operate in the high frequency access mode when accessing the second zone.

In another embodiment, the write frequency falls below the threshold due to the disk drive being disconnected from the host.

In yet another embodiment, the parameter comprises a servo control parameter for actuating the head over the disk. In one embodiment, the parameter comprises a seek trajectory, in another embodiment the parameter comprises a repeatable runout compensation, and in another embodiment the parameter comprises a degree of disk revolution for the head to settle on a target track after seeking the head to the target track.

In still another embodiment, the parameter comprises a write current setting, and in one embodiment, when in the low frequency access mode, the write current setting is decreased and write operations are performed by writing data to an area of the disk at least twice.

In another embodiment, each track comprises a plurality of data sectors, and the parameter comprises a track level redundancy generated in response to the data sectors stored in a track. In one embodiment, the control circuitry dynamically assigns memory for storing the track level redundancy to the zones.

In one embodiment, a refresh monitor is maintained for each zone, and data recorded in a zone is refreshed in response to the corresponding refresh monitor. In one embodiment, data recorded in a zone is refreshed at a refresh interval, and when in the low frequency access mode, the refresh interval is increased.

Another embodiment of the present invention comprises a disk drive including a disk comprising a plurality of tracks, and a head actuated over the disk. A plurality of zones are defined on the disk, including a first zone and a second zone. The disk drive is configured to operate in a high frequency access mode when accessing the first zone, wherein the disk drive is configured according to a parameter so as to increase the performance of the disk drive. The disk drive is configured to operate in a low frequency access mode when accessing the second zone, wherein the disk drive is configured according to a parameter so as to increase the reliability of the disk drive. A write frequency of write data received from a host for the first zone is monitored, and when the write frequency for the first zone falls below a threshold, data stored in the first zone is copied to the second zone.

DETAILED DESCRIPTION OF EMBODIMENTS OF THE INVENTION

Figure 1A:
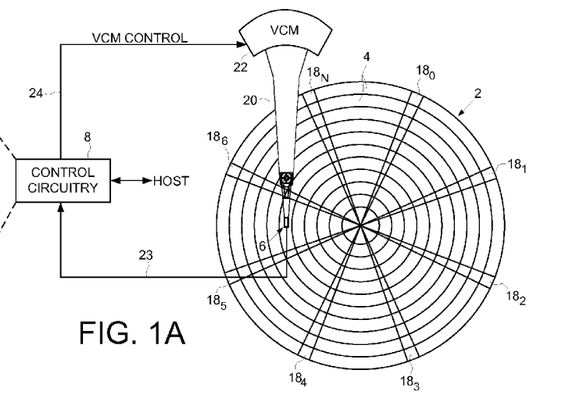
FIG. 1A shows a disk drive according to an embodiment of the present invention comprising a disk, a head actuated over the disk, and control circuitry.
Figure 1B:
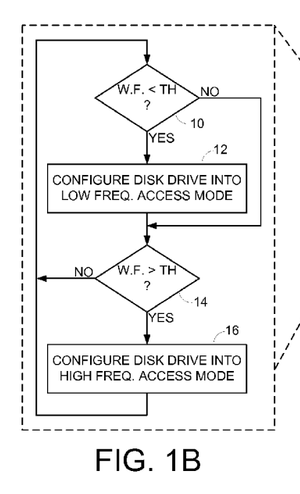
FIG. 1B is a flow diagram according to an embodiment of the present invention for configuring the disk drive into a low or high frequency access mode based on a write frequency of write data received from a host.

FIG. 1A shows a disk drive according to an embodiment of the present invention including a disk 2 having a plurality of tracks 4, and a head 6 actuated over the disk 2. The disk drive further comprises control circuitry 8 for monitoring a write frequency of write data received from a host, and executing the flow diagram of FIG. 1B. When the write frequency falls below a threshold (step 10), the disk drive is configured to operate in a low frequency access mode when accessing the disk 2 (step 12), wherein a parameter of the disk drive is configured to increase the reliability of the disk drive. When the write frequency rises above a threshold (step 14), the disk drive is configured to operate in a high frequency access mode when accessing the disk 2 (step 16), wherein the parameter of the disk drive is configured to increase the performance of the disk drive.

The disk drive is configured into a higher reliability mode when the write frequency decreases in order to help protect the data against magnetic entropy. In one embodiment, only the write operations are configured to operate with higher reliability to avoid performance loss during read operations. Although there is a performance loss for write operations, it is less of a concern since the write frequency has decreased. In addition, in an embodiment described in more detail below, a refresh interval may be increased when the disk drive is operating with higher reliability which may improve performance by reducing the frequency of refresh operations.

In the embodiment of FIG. 1A, the disk 2 comprises a plurality of embedded servo sectors $18_0$-$18_N$ that define the tracks 4. Each embedded servo sector 18 comprises coarse head positioning information (e.g., a track address) and fine head positioning information (e.g., servo bursts). The head 6 is attached to a distal end of an actuator arm 20 which is rotated about a pivot by a voice coil motor (VCM) 22 in order to actuate the head 6 radially over the disk 2. The control circuitry 8 processes the read signal 23 emanating from the head 6 in order to demodulate the head position information recorded in the embedded servo sectors $18_0$-$18_N$. After suitable compensation (e.g., filtering), the control circuitry 8 generates a control signal 24 applied to the VCM 22 in order to seek and maintain the head 6 over a target track during write and read operations.

Figure 2A:
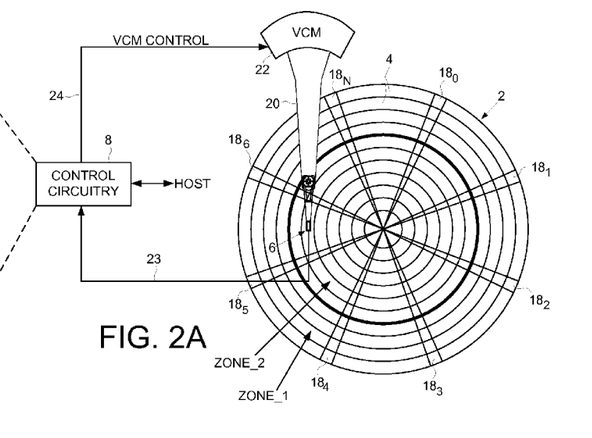
FIG. 2A shows a disk drive according to an embodiment of the present invention wherein the disk comprises a plurality of zones.
Figure 2B:
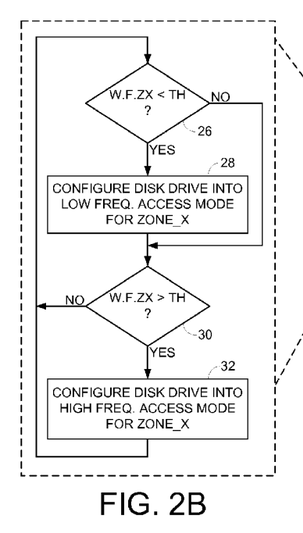
FIG. 2B is a flow diagram according to an embodiment of the present invention for configuring the disk drive to access each zone in the low or high frequency access mode.

FIG. 2A shows an embodiment of the present invention wherein a plurality of zones are defined on the disk 2, including a first zone (e.g., ZONE_1) and a second zone (e.g., ZONE_2). The control circuitry 8 monitors a write frequency of write data received from the host for the first and second zones and executes the flow diagram of FIG. 2B. When the write frequency for the first zone falls below a threshold (step 26), the disk drive is configured to operate in the low frequency access mode when accessing the first zone (step 28). When the write frequency for the first zone rises above a threshold (step 30), the disk drive is configured to operate in the high frequency access mode when accessing the first zone (step 32). Similarly, when the write frequency for the second zone falls below a threshold (step 26), the disk drive is configured to operate in the low frequency access mode when accessing the second zone (step 28). When the write frequency for the second zone rises above a threshold (step 30), the disk drive is configured to operate in the high frequency access mode when accessing the second zone (step 32). Partitioning the disk 2 into zones may improve performance by increasing the reliability (and optionally a refresh interval) only for data areas of the disk 2 having a low write frequency rather than for the entire disk surface.

The write frequency may decrease and fall below the threshold for a number of reasons, for example, if the data written to the disk is archive data (data not frequently overwritten), or if the disk drive is disconnected from the host for a long period of time (e.g., an archive disk drive). In one embodiment, the control circuitry 8 comprises suitable circuitry for monitoring the write frequency (and a refresh interval) while disconnected from the host, and in one embodiment, even while powered down (e.g., a battery powered monitor). As described in more detail below, if a refresh monitor indicates a need for a refresh operation, the control circuitry 8 comprises suitable circuitry to wake up the disk drive and perform the refresh operation independent of the host. If the idle time of the disk drive exceeds the write frequency threshold (meaning that the write frequency falls below the threshold), the control circuitry 8 will configure the disk drive into the low frequency access mode, perform the refresh operation with a higher reliability, and then increase the next refresh interval.

Any suitable parameter (or parameters) of the disk drive may be adjusted to configure the disk drive into the low or high frequency access mode. In one embodiment, the parameter comprises a servo control parameter for actuating the head 6 over the disk 2. For example, the parameter may comprise a seek trajectory, in another embodiment the parameter may comprise a repeatable runout compensation, and in another embodiment the parameter may comprise a degree of disk revolution for the head 6 to settle on a target track after seeking the head 6 to the target track.

In another embodiment, the parameter comprises a write current setting for the head 6. For example, in one embodiment, when in the low frequency access mode, the write current setting is decreased and write operations are performed by writing data to an area of the disk at least twice. This embodiment may increase the reliability of other data recorded on the disk by reducing the fringe field from the write element, thereby reducing adjacent track interference. Writing the data over multiple passes also helps ensure the written data saturates the magnetic grains along the written track.

Figure 3A:
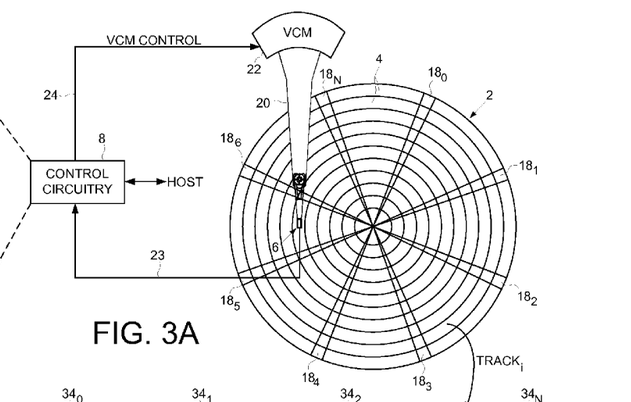
FIG. 3A shows a disk drive according to an embodiment of the present invention wherein a zone comprises an entire disk surface.
Figure 3B:
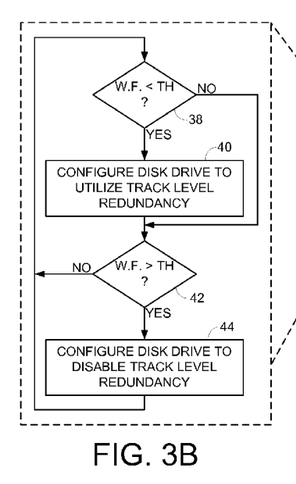
FIG. 3B is a flow diagram according to an embodiment of the present invention for configuring the disk drive to utilize track level redundancy while in the low frequency access mode.
Figure 3C:
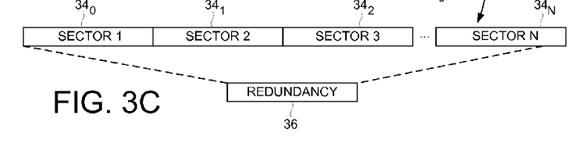
FIG. 3C illustrates an embodiment of track level redundancy.

FIG. 3A shows an embodiment of the present invention wherein each track 4 comprises a plurality of data sectors $34_0$-$34_N$, and the parameter comprises a track level redundancy 36 generated in response to the data sectors $34_0$-$34_N$ stored in a track (FIG. 3C). Any suitable technique for generating the track level redundancy 36 may be employed in the embodiments of the present invention, such as generating a parity sector over the data sectors in the track. The track level redundancy 36 may cover one or more tracks, or it may cover a partial track. If a data sector is unrecoverable using the sector level redundancy (e.g., Reed-Solomon ECC), the track level redundancy 36 may be used to recover the data sector. The control circuitry 8 executes the flow diagram of FIG. 3B, wherein when the write frequency falls below a threshold (step 38), the disk drive is configured to utilize the track level redundancy (step 40). When the write frequency rises above a threshold (step 42), the disk drive is configured to disable the track level redundancy (step 44). Utilizing track level redundancy 36 increases reliability, but may also reduce performance during write operations since generating or regenerating the track level redundancy may require additional rotational latency.

Figure 4A:
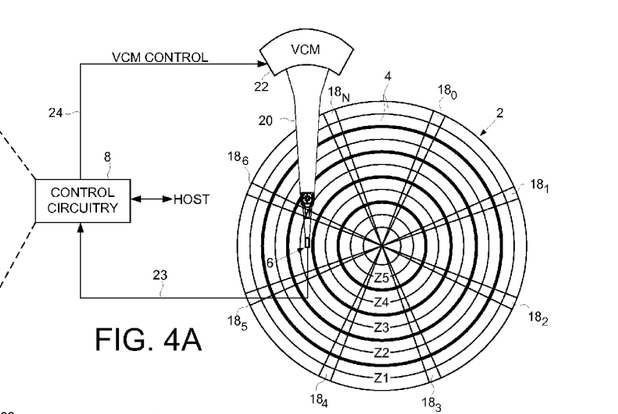
FIG. 4A shows a disk drive according to an embodiment of the present invention wherein the disk is partitioned into five zones comprising two tracks each.
Figure 4B:
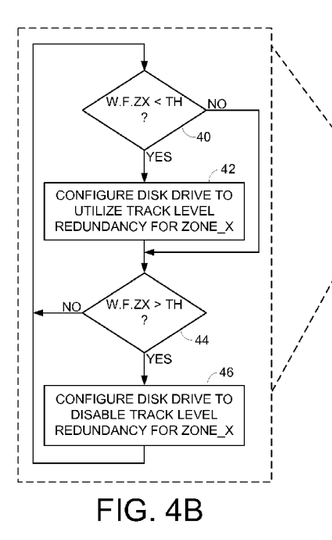
FIG. 4B is a flow diagram according to an embodiment of the present invention for dynamically assigning track level redundancy to zones configured into the low frequency access mode.
Figure 4C:
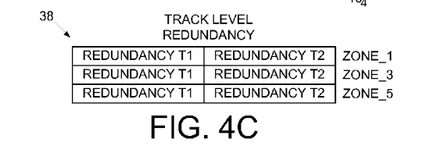
FIG. 4C illustrated track level redundancy assigned to three of five zones.

The track level redundancy 36 may be stored in any suitable non-volatile memory, such as on the disk 2 or in a FLASH semiconductor memory implemented as part of the control circuitry 8. Storing the track level redundancy 36 in FLASH may avoid the latency of seeking to tracks on the disk 2 that store the track level redundancy. In one embodiment, the control circuitry 8 dynamically assigns memory for storing the track level redundancy to zones. An example of this embodiment is illustrated in FIG. 4A wherein the disk 2 is partitioned into five zones (Z1-Z5) each comprising two tracks, with non-volatile memory 38 for storing track level redundancy for up to three of the zones (FIG. 4C). The control circuitry 8 executes the flow diagram of FIG. 4B wherein when the write frequency for a zone falls below a threshold (step 40), the memory 38 for storing track level redundancy is assigned to that zone (step 42). In one embodiment, the control circuitry 8 generates the track level redundancy 36 for the data already recorded in the zone either immediately, or during an idle mode of the disk drive. When the write frequency for a zone rises above the threshold (step 44), the control circuitry 8 de-allocates the memory 38 for the zone so that it may be used for a different zone (step 46). In one embodiment, the track level redundancy 36 stored in the memory 38 for a de-allocated zone may still be used to recover a data sector for the zone if the track level redundancy 36 for that zone is still valid.

Figure 5A:
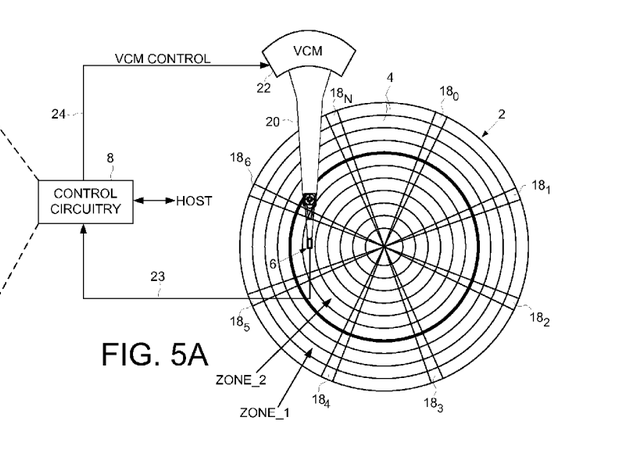
FIG. 5A shows a disk drive according to an embodiment of the present invention wherein the disk is partitioned into two zones (a high frequency access zone and a low frequency access zone).
Figure 5B:
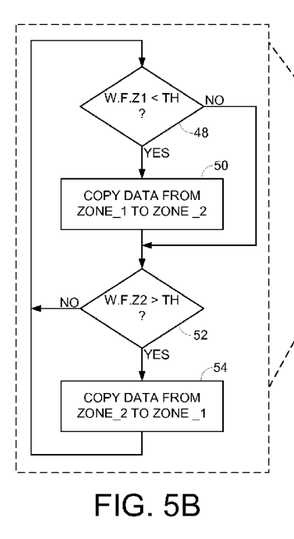
FIG. 5B is a flow diagram according to an embodiment of the present invention for copying data between the zones depending on the write frequency to the data within the zones.

FIG. 5A shows another embodiment of the present invention wherein the disk 2 comprises a plurality of zones, including a first zone (e.g., ZONE_1) and a second zone (e.g., ZONE_2). The disk drive is configured to operate in a high frequency access mode when accessing the first zone, wherein the disk drive is configured according to a parameter so as to increase the performance of the disk drive. The disk drive is configured to operate in a low frequency access mode when accessing the second zone, wherein the disk drive is configured according to the parameter so as to increase the reliability of the disk drive. The control circuitry 8 monitors the write frequency of write data received from the host for the first zone and executes the flow diagram of FIG. 5B. When the write frequency for the first zone falls below a threshold (step 48), data stored in the first zone is copied to the second zone (step 50). When the write frequency for the second zone rises above a threshold (step 52), data stored in the second zone is copied to the first zone (step 54).

Figure 6A:
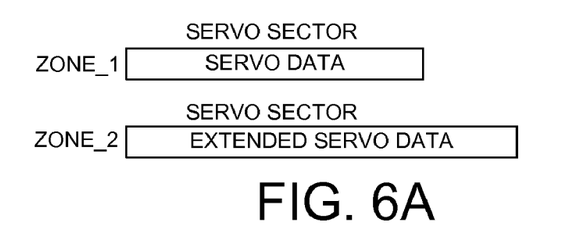
FIG. 6A shows a servo sector format of the high frequency access zone and the low frequency access zone according to an embodiment of the present invention.

In one embodiment, the disk drive is configured according to a parameter corresponding to a different format between the zones. In one embodiment, the parameter comprises a servo control parameter for actuating the head 6 over the disk 2, such as a format of the servo sectors. This embodiment is illustrated in FIG. 6A wherein the servo sectors of ZONE_1 comprise a first format for the servo data, and the servo sectors of ZONE_2 comprise a second extended format for the servo data. For example, in one embodiment the servo data of ZONE_1 comprises no (or reduced) repeatable runout compensation data, whereas the servo data of ZONE_2 comprises repeatable runout information. The extended repeatable runout compensation improves the compensation for repeatable runout due to eccentricity in the rotation of the disk 2 which in turn improves the reliability of write/read operations. However, the extended servo sectors reduce the capacity of the disk 2 to store user data.

Figure 6B:
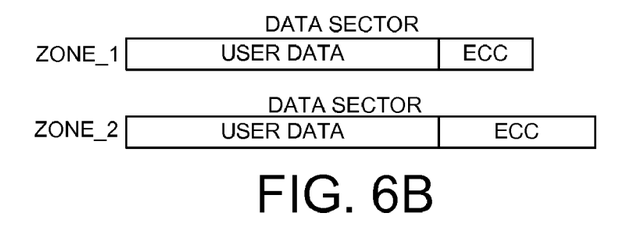
FIG. 6B shows a data sector format of the high frequency access zone and the low frequency access zone according to an embodiment of the present invention.
Figure 6C:
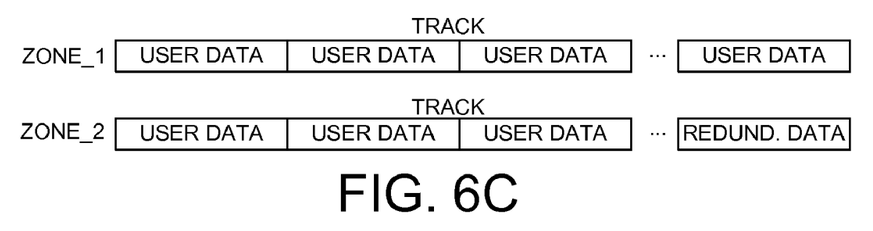
FIG. 6C shows a track format of the high frequency access zone and the low frequency access zone according to an embodiment of the present invention.

In another embodiment, the parameter comprises an error correction setting. For example, in an embodiment illustrated in FIG. 6B, the parameter comprises a sector level redundancy (e.g., Reed-Solomon ECC) generated in response to user data stored in a data sector, wherein the data sector format of ZONE_2 utilizes more sector level redundancy as compared to ZONE_1. The increased sector level redundancy increases the reliability of the disk drive, but decreases the capacity to store user data. In another embodiment, the parameter comprises a track level redundancy generated in response to the data sectors stored in a track. This embodiment is illustrated in FIG. 6C wherein the tracks of ZONE_1 comprise no track level redundancy (all sectors are data sectors), whereas the tracks of ZONE_2 comprise one or more sectors of track level redundancy.

In another embodiment, the parameter comprises a radial tracks per inch (TPI) recording density. For example, the TPI of ZONE_1 may be greater than the TPI of ZONE_2 in order to increase the capacity of ZONE_1 and increase the reliability of ZONE_2. A lower TPI may increase the reliability by reducing adjacent track interference during write operations. In another embodiment, the parameter comprises a linear bits per inch (BPI) recording density. For example, the BPI of the data sectors recorded in ZONE_1 may be greater than the BPI of the data sectors recorded in ZONE_2 in order to increase the capacity of ZONE_1 and increase the reliability of ZONE_2. A lower BPI may increase the reliability by increasing the number of magnetic grains per bit cell.

Any suitable number of zones may be employed in the embodiments of the present invention, as well as any suitable format for the zones. For example, each zone may comprise an entire disk surface, or part of a disk surface. Each zone may comprise a single track or a plurality of tracks of a disk surface, and a zone may span more than one disk surface.

In one embodiment, a refresh monitor is maintained for each zone, and data recorded in a zone is refreshed (read and rewritten) in response to the corresponding refresh monitor. In the embodiment of FIG. 2A, the control circuitry 8 may refresh the data recorded in a zone at a refresh interval, wherein the refresh interval may be increased when in the low frequency access mode. In other words, when the zone is accessed with higher reliability while in the low frequency access mode, the refresh interval can be increased since the data will not degrade as fast compared to when the zone is accessed in the high frequency access mode. Similarly in the embodiment of FIG. 5A, the refresh interval for ZONE_1 may be less than the refresh interval for the ZONE_2, since ZONE_2 is accessed with higher reliability.

Figure 7A:
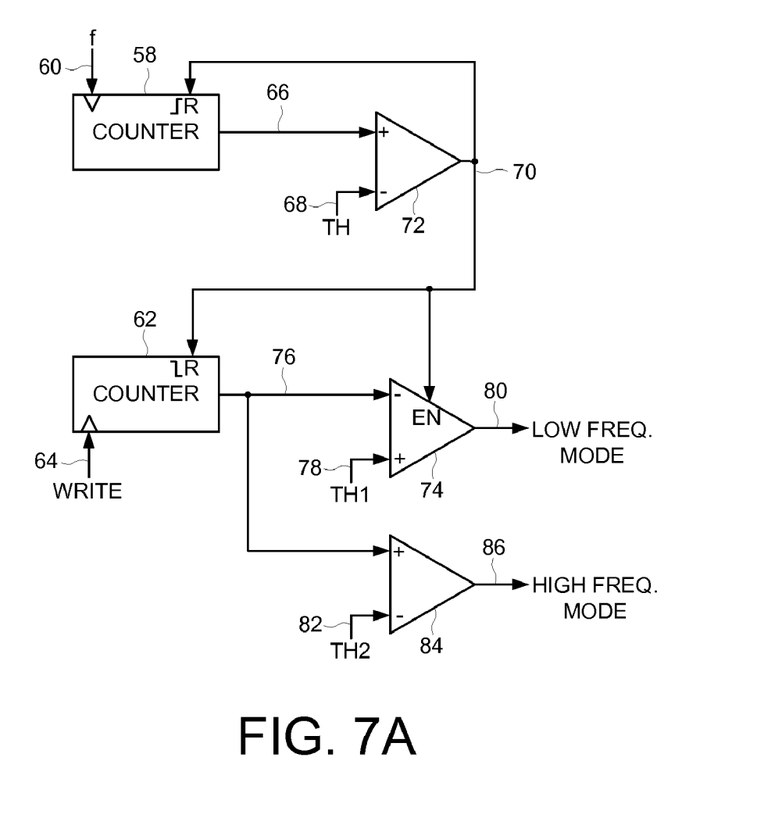
FIG. 7A shows an embodiment of the present invention for detecting the access mode of the zone.

FIG. 7A shows control circuitry that may be implemented by control circuitry 8 according to an embodiment of the present invention that may be used for detecting the access mode. Although not illustrated, in the embodiments comprising multiple zones, the circuitry of FIG. 7A may be duplicated for each zone. An interval counter 58 is clocked at a frequency f 60 in order to track a write frequency interval, and a write counter 62 is clocked by a write signal 64 in order to count the number of write operations during the write frequency interval. When the output 66 of the interval counter 58 exceeds a threshold 68, the output 70 of comparator 72 enables comparator 74 which compares the output 76 of the write frequency counter 62 to a first threshold 78. If the output 76 is less than the threshold 78, a low frequency mode signal 80 is activated to configure the zone into the low frequency access mode. If the output 76 of the write frequency counter 62 exceeds a second threshold 82 any time during the write frequency interval, then comparator 84 activates a high frequency mode signal 86 to configure the zone into the high frequency access mode. When the low frequency mode signal 80 is activated, the zone remains in the low frequency access mode until the high frequency mode signal 86 is activated, and vice-versa. The output 70 of comparator 72 may reset the interval counter 58 at the end of the interval on the rising edge, and may also reset the write frequency counter 62 on the falling edge.

Any suitable threshold 68 may be selected to generate a suitable write frequency interval. In one embodiment, a shorter write frequency interval may be selected so that the access mode tracks the real time write frequency of the zone. Alternatively, a longer write frequency interval may be selected so that the access mode changes less frequently (e.g., to ensure a zone is in an archive mode before changing to the low frequency access mode). In one embodiment, the thresholds 78 and 82 are selected to implement a suitable hysteresis to prevent the disk drive from toggling between the access modes. In addition, the first and second threshold 78 and 82 may be selected to achieve any suitable performance/reliability balance as determined, for example, during lifetime testing for a family of disk drives. In another embodiment, the first and second thresholds 78 and 82 may be configured in-the-field relative to a particular application or operating environment, and in another embodiment the thresholds 78 and 82 may be adaptable, for example, based on the access frequency (read and write) of the host.

Figure 7B:
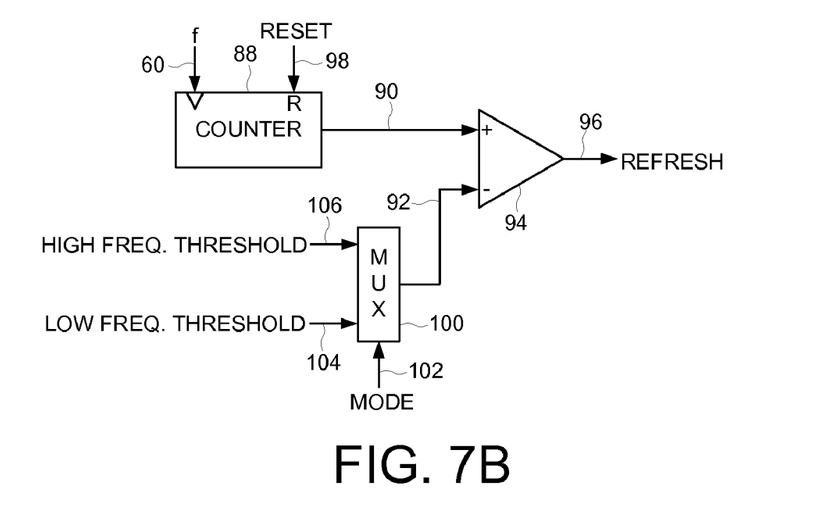
FIG. 7B shows an embodiment of the present invention for detecting when to refresh a zone, wherein the refresh interval is adjusted relative to the access mode of the zone.

FIG. 7B shows control circuitry that may be implemented by control circuitry 8 that may be used for implementing a refresh monitor for refreshing a zone according to an embodiment of the present invention. A refresh interval counter 88 is clocked at a frequency f 60 in order to track a refresh interval. When the output 90 of the refresh interval counter 88 exceeds a threshold 92 at comparator 94, a refresh signal 96 is activated to refresh the zone. After refreshing the zone, the refresh interval counter 88 is reset by signal 98.

In one embodiment, when in the low frequency access mode, the data recorded in the zone is refreshed using high reliability (written back to the same zone using high reliability parameters or copied to a high reliability zone), and the next refresh interval for the zone is increased. The next refresh interval for the zone may be increased in any suitable manner, such as by increasing the threshold 92 for comparator 94 by selecting an appropriate threshold, such as low frequency threshold 104, through multiplexer 100 in response to a mode signal 102. Alternatively, the frequency f 60 or the increment value of the refresh interval counter 88 may be decreased in order to increase the next refresh interval. Conversely, when in the high frequency access mode, the data recorded in the zone is refreshed using high performance (written back to the same zone using high performance parameters or copied to a high performance zone), and the next refresh interval for the zone may be decreased, such as by selecting high frequency threshold 106.

Any suitable control circuitry 8 may be employed in the embodiments of the present invention, such as any suitable integrated circuit or circuits. For example, the control circuitry 8 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or a system on a chip (SOC). In addition, the control circuitry may include a suitable preamp circuit implemented as a separate integrated circuit, integrated into the read channel or disk controller circuit, or integrated into an SOC.

In one embodiment, the control circuitry 8 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 2 and read into a volatile semiconductor memory when the disk drive is powered on. In yet another embodiment, the control circuitry 8 comprises suitable logic circuitry, such as state machine circuitry.

What is claimed is:

1. A disk drive comprising:
   a disk comprising a plurality of tracks;
   a head actuated over the disk; and
   control circuitry operable to:
      monitor a write frequency of write data received from a host;
      when the write frequency falls below a threshold, configure the disk drive to operate in a low frequency access mode when accessing the disk, wherein a parameter of the disk drive is configured to decrease a throughput of the disk drive; and when the write frequency rises above a threshold, configure the disk drive to operate in a high frequency access mode when accessing the disk, wherein the parameter of the disk drive is configured to increase the throughput of the disk drive.

2. The disk drive as recited in claim 1, wherein the control circuitry is further operable to:
define a plurality of zones on the disk, including a first zone and a second zone;
monitor a write frequency of write data received from the host for the first and second zones;
when the write frequency for the first zone falls below a threshold, configure the disk drive to operate in the low frequency access mode when accessing the first zone;
when the write frequency for the first zone rises above a threshold, configure the disk drive to operate in the high frequency access mode when accessing the first zone;
when the write frequency for the second zone falls below a threshold, configure the disk drive to operate in the low frequency access mode when accessing the second zone; and
when the write frequency for the second zone rises above a threshold, configure the disk drive to operate in the high frequency access mode when accessing the second zone.

3. The disk drive as recited in claim 1, wherein the write frequency falls below the threshold due to the disk drive being disconnected from the host.

4. The disk drive as recited in claim 1, wherein the parameter comprises a servo control parameter for actuating the head over the disk.

5. The disk drive as recited in claim 4, wherein the parameter comprises a seek trajectory.

6. The disk drive as recited in claim 4, wherein the parameter comprises a repeatable runout compensation.

7. The disk drive as recited in claim 4, wherein the parameter comprises a degree of disk revolution for the head to settle on a target track after seeking the head to the target track.

8. The disk drive as recited in claim 1, wherein the parameter comprises a write current setting.

9. The disk drive as recited in claim 8, wherein when in the low frequency access mode, the control circuitry is further operable to decrease the write current setting and perform write operations by writing data to an area of the disk at least twice.

10. The disk drive as recited in claim 1, wherein each track comprises a plurality of data sectors, and the parameter comprises a track level redundancy generated in response to the data sectors stored in a track.

11. The disk drive as recited in claim 2, wherein each track comprises a plurality of data sectors, and the parameter comprises a track level redundancy generated in response to the data sectors stored in a track.

12. The disk drive as recited in claim 11, wherein the control circuitry dynamically assigns memory for storing the track level redundancy to the zones.

13. The disk drive as recited in claim 2, wherein the control circuitry is further operable to:
maintain a refresh monitor for each zone; and
refresh data recorded in a zone in response to the corresponding refresh monitor.

14. The disk drive as recited in claim 13, wherein the control circuitry is further operable to:
refresh data recorded in a zone at a refresh interval; and
when in the low frequency access mode, increase the refresh interval.

15. A disk drive comprising:
a disk comprising a plurality of tracks;
a head actuated over the disk; and
control circuitry operable to:
define a plurality of zones on the disk, including a first zone and a second zone;
configure the disk drive to operate in a high frequency access mode when accessing the first zone, wherein the disk drive is configured according to a parameter so as to increase the performance of the disk drive;
configure the disk drive to operate in a low frequency access mode when accessing the second zone, wherein the disk drive is configured according to the parameter so as to increase the reliability of the disk drive;
monitor a write frequency of write data received from a host for the first zone; and
when the write frequency for the first zone falls below a threshold, copy data stored in the first zone to the second zone.

16. The disk drive as recited in claim 15, wherein the control circuitry is further operable to:
monitor a write frequency of write data received from a host for the second zone; and
when the write frequency for the second zone rises above a threshold, copy data stored in the second zone to the first zone.

17. The disk drive as recited in claim 15, wherein the parameter comprises a servo control parameter for actuating the head over the disk.

18. The disk drive as recited in claim 17, wherein the parameter comprises a servo sector format.

19. The disk drive as recited in claim 18, wherein the parameter comprises a repeatable runout compensation.

20. The disk drive as recited in claim 15, wherein the parameter comprises an error correction setting.

21. The disk drive as recited in claim 20, wherein each track comprises a plurality of data sectors, and the parameter comprises a sector level redundancy generated in response to user data stored in a data sector.

22. The disk drive as recited in claim 20, wherein each track comprises a plurality of data sectors, and the parameter comprises a track level redundancy generated in response to the data sectors stored in a track.

23. The disk drive as recited in claim 15, wherein the parameter comprises a radial tracks per inch recording density.

24. The disk drive as recited in claim 15, wherein the parameter comprises a linear bits per inch recording density.

25. The disk drive as recited in claim 15, wherein the control circuitry is further operable to:
maintain a refresh monitor for each zone; and
refresh data recorded in a zone in response to the corresponding refresh monitor.

26. The disk drive as recited in claim 25, wherein the control circuitry is further operable to refresh data recorded in a zone at a refresh interval, wherein the refresh interval for the first zone is less than the refresh interval for the second zone.

27. A disk drive comprising:
a disk comprising a plurality of tracks;
a head actuated over the disk;
a means for monitoring a write frequency of write data received from a host;
when the write frequency falls below a threshold, a means for configuring the disk drive to operate in a low frequency access mode when accessing the disk, wherein a parameter of the disk drive is configured to decrease a throughput of the disk drive; and when the write frequency rises above a threshold, a means for configuring the disk drive to operate in a high frequency access mode when accessing the disk, wherein the parameter of the disk drive is configured to increase the throughput of the disk drive.

28. A disk drive as comprising:

a disk comprising a plurality of tracks;

a head actuated over the disk; and a means for defining a plurality of zones on the disk, including a first zone and a second zone;

a means for configuring the disk drive to operate in a high frequency access mode when accessing the first zone, wherein the disk drive is configured according to a parameter so as to increase the performance of the disk drive;

a means for configuring the disk drive to operate in a low frequency access mode when accessing the second zone, wherein the disk drive is configured according to the parameter so as to increase the reliability of the disk drive;

a means for monitoring a write frequency of write data received from a host for the first zone; and when the write frequency for the first zone falls below a threshold, a means for copying data stored in the first zone to the second zone.

* * * * *